Patented Mar. 8, 1927.

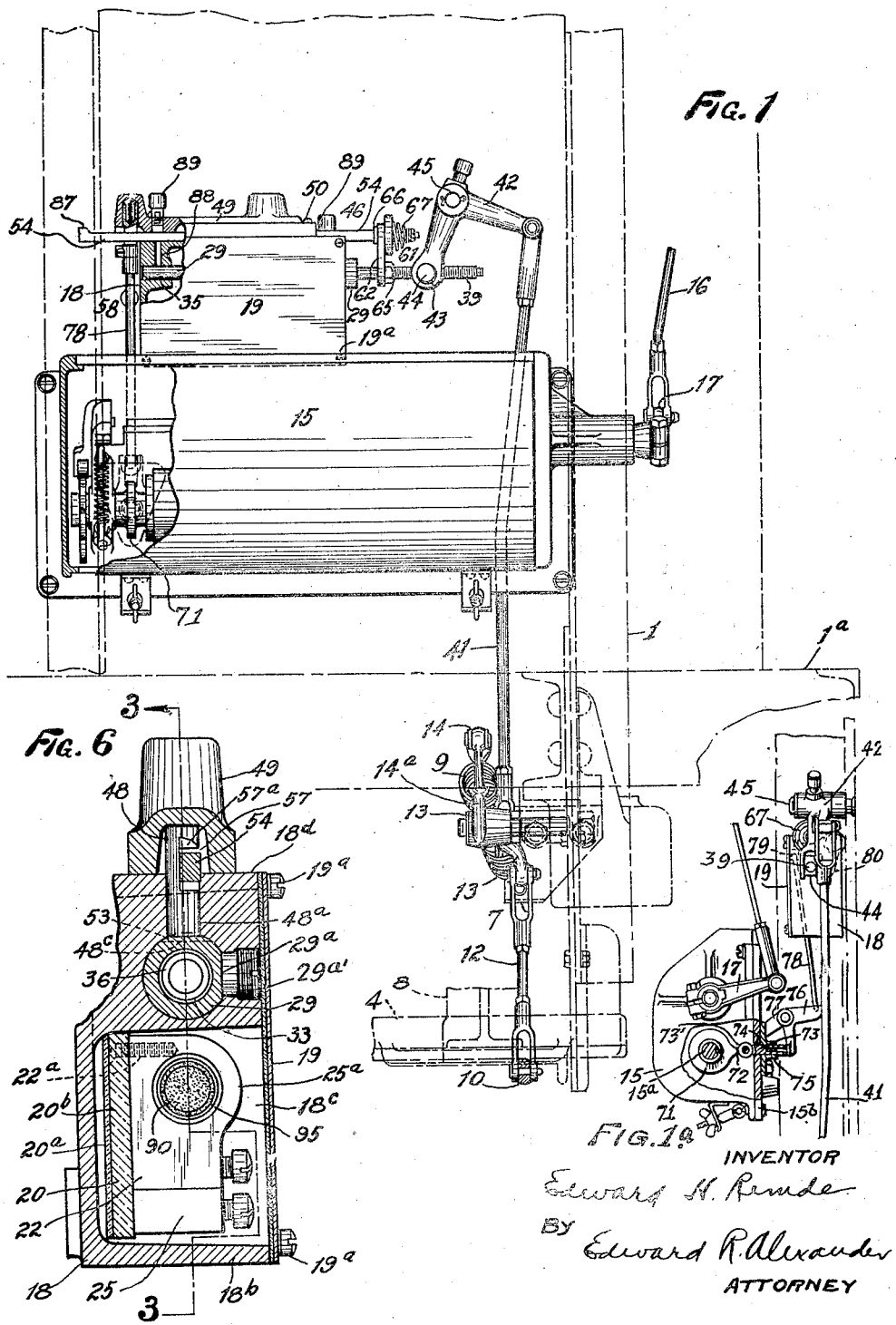

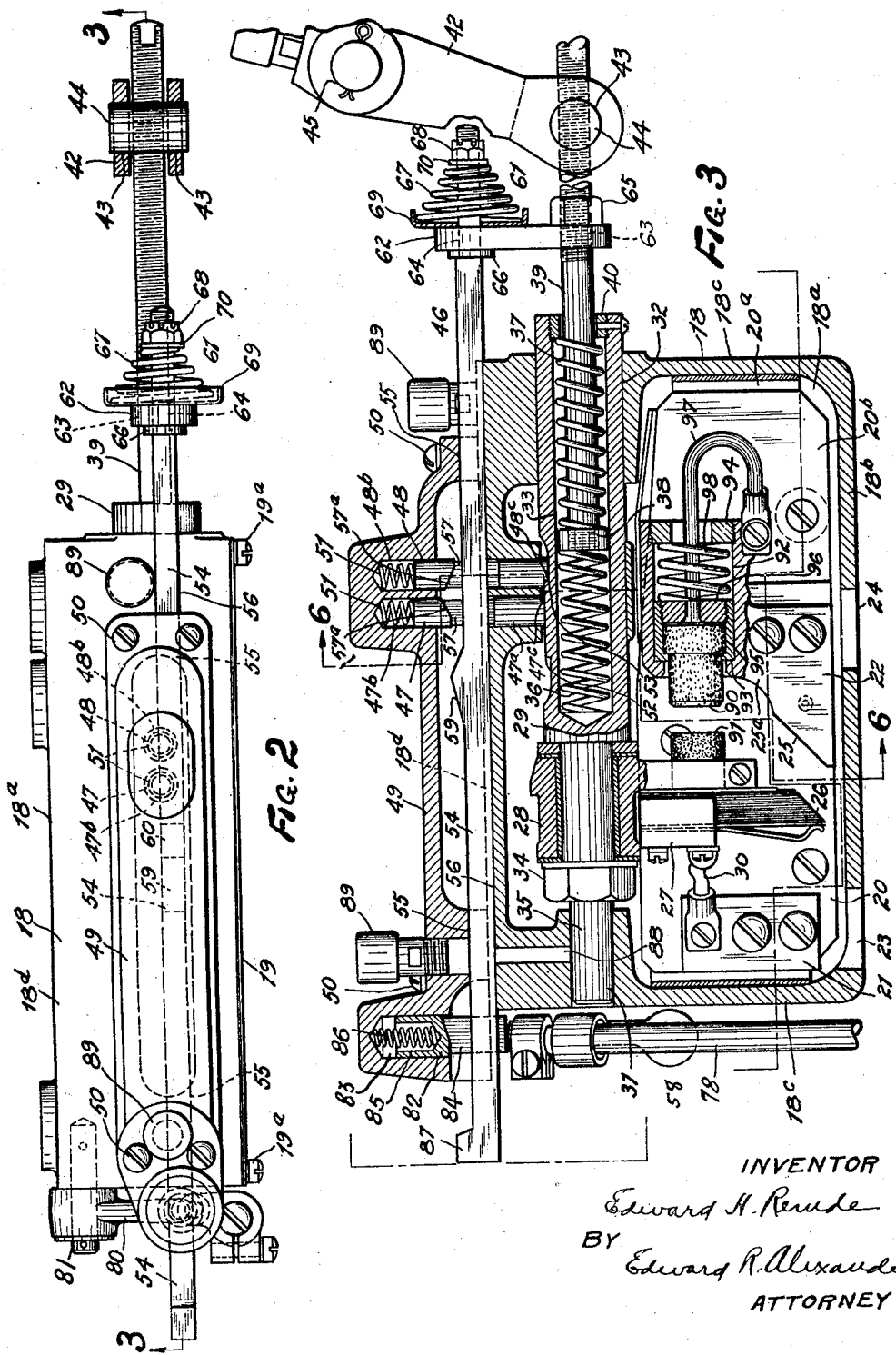

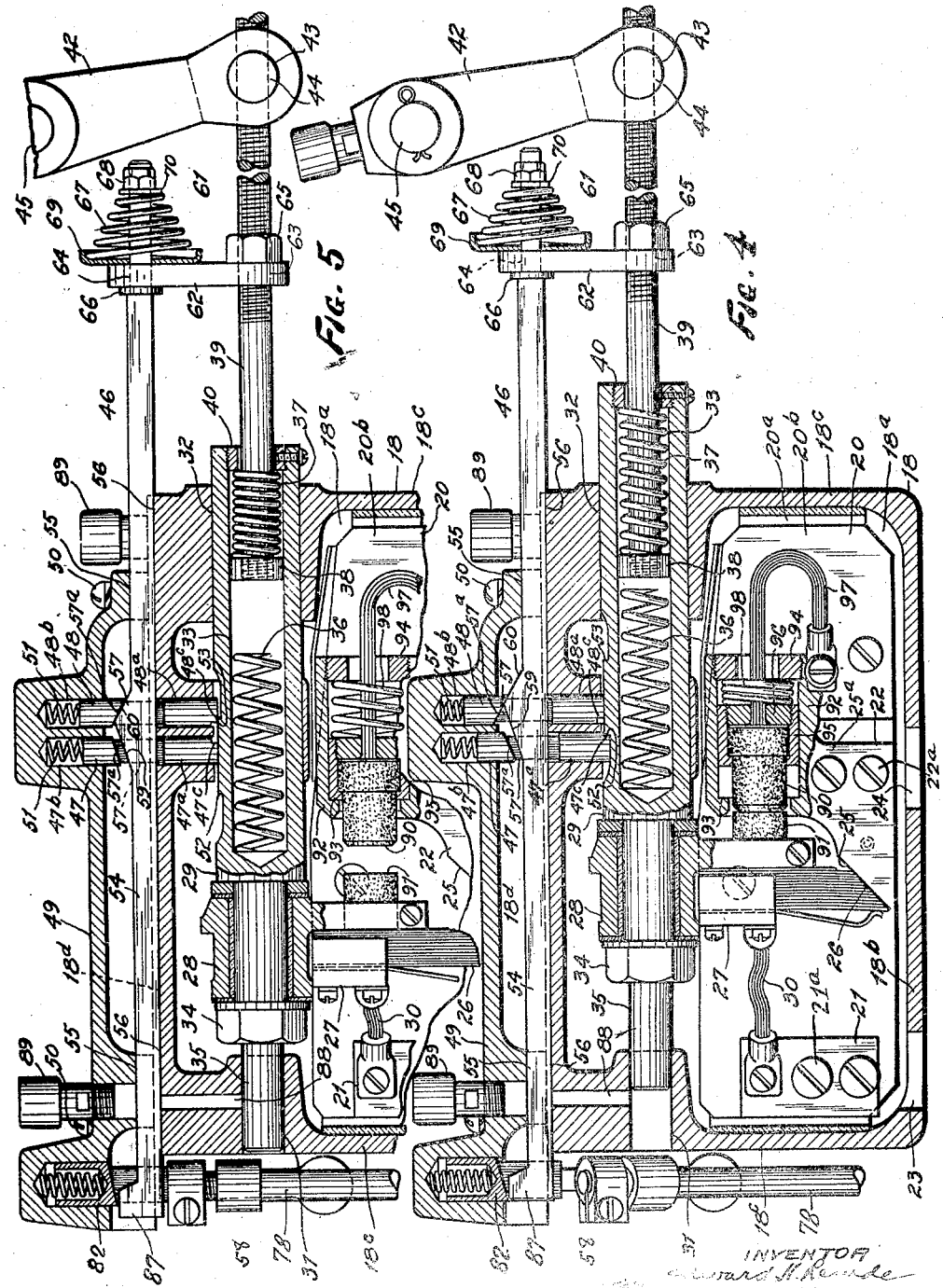

1,620,167

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

SWITCH MECHANISM.

Original application filed February 13, 1922, Serial No. 536,296. Divided and this application filed May 25, 1925. Serial No. 32,736.

This invention relates to a switch mechanism for opening and closing the contacts of an electric circuit. This application is a division of my application Serial No. 536,296, filed February 13, 1922, wherein the invention is shown associated with a normally applied brake for a vehicle and an interlock for the controller.

One object of the invention is to construct an improved snap acting switch wherein the movable contact is positively controlled.

Another object of the invention is to provide an improved circuit opening and closing mechanism in which a reciprocating member, controlled by a plurality of cams, causes the engagement and disengagement of a pair of contact elements to open and close an electric circuit.

Other objects of the invention will be apparent to those skilled in the art to which my invention relates from the following description taken in connection with the accompanying drawings.

In the drawings, Fig. 1 is a fragmentary front view of the circuit opening and closing mechanism, a portion of the vehicle with which the mechanism is associated being shown in dotted lines.

Fig. 2 is a top plan view of parts shown in Fig. 1.

Fig. 3 is a section on the line 3—3 of Fig. 2.

Fig. 4 is a section similar to Fig. 3, but showing the position of the parts when the circuit is closed.

Fig. 5 is a fragmentary section similar to Figs. 3 and 4, but showing the position of the parts when the circuit is open and the parts are about to be moved to close the circuit.

Fig. 6 is a section on the line 6—6 of Fig. 3.

I have by preference, shown my invention as applied to an electrically driven vehicle, for example, an industrial truck, and adapted it for controlling the circuit to the motor which drives the traction wheels therefor, but it will be obvious that the mechanism may be interposed in any electric circuit, whether the same forms a part of a mechanism for or associated with a vehicle or not.

In the drawings, 1 indicates the frame of the vehicle, mounted on suitable wheels. Either or both pairs of wheels may be steered and driven in any desired manner.

4 indicates a platform on which the operative who operates the vehicle, may stand. The platform is connected to the frame 1 in any desired manner.

7 indicates a braking mechanism suitably supported and normally acted on by a spring 9 to apply the brake. 8 indicates a member, such as a foot pedal associated with platform 4, pivotally mounted on the frame 1 and connected to the brake mechanism 7, whereby the latter will be released by the operative when operated downwardly. The connections between the pedal 8 and brake mechanism 7 preferably comprise a tail piece 10 fixed to the rock shaft for the member 8, a link 12 connected to the tail piece 10 at one end and at its other end connected to a lever 13, and a link 14 connected to the lever 13 at one end and at its other end connected to elements of the brake.

15 indicates a controller of any suitable construction, operated through an arm 17 and a rod 16 by a lever (not shown) to control the operation of the motor for the wheels in either direction.

My improved circuit controlling or opening and closing mechanism is interposed mechanically between the brake operating member 8, the brake mechanism 7 or one element of the operating connections for the latter, (preferably the lever 13) and the controller 15 and is operatively connected thereto, whereby the circuit may be controlled in the manner hereinafter set forth.

18 indicates a casing or box-like member adapted to be fixed in any desired manner to the dash or other part of the vehicle frame 1.

19 is a cover for the casing 18 removably held in position by a plurality of screws or other devices $19^a$.

20 indicates a base of insulating material fixed to the back wall $18^a$ of the casing 18. The base preferably comprises a layer of micanite $20^a$ and a layer of ebony asbestos board $20^b$.

21, 22, indicate a pair of terminals, fixed to the base 20 by screws $21^a$, $22^a$, respectively, as shown in Fig. 4. The terminal 21 is adapted to have connected to it a lead (not shown) from the source of current supply, an opening 23 being formed in the bottom wall $18^b$ to accommodate the lead; whereas the terminal 22 is adapted to have connected to it a lead (not shown) connected to the controller 15, an opening 24 being formed in the bottom wall 18ᵇ to accommodate the lead. The terminal 22 is fashioned or shaped to provide a contact 25 with which a movable contact 26 engages to close the circuit from the source of current supply to one terminal of the controller 15 through the leads just referred to and disengages to open said circuit. The contact 26 is preferably formed of laminæ. The contact 26 is secured at its upper end to a block (formed of suitable conducting material) 27 having a sleeve 28 which is fixed to but insulated from a reciprocating member 29, which will be later described.

The block 27 is connected with the terminal 21 by a flexible conductor 30, which is long enough to permit movement of the contact 26 and block 27 with the reciprocating member 29.

The conductor 30 is connected to the block 27 and terminal 21 in any desired manner. The reciprocating member 29 comprises a rod which extends through the casing 18, being mounted to slide at its opposite ends in openings 31, 32, formed in thickened portions of the end walls 18ᶜ, 18ᵉ, of the casing 18.

The rod 29 has an enlarged portion which is bored out from one end, as shown at 33, for a purpose to be later set forth. The enlarged portion of the rod forms a shoulder against which the sleeve 28 is rigidly clamped by a nut 34. The rod 29 is preferably reduced at its other end, as shown at 35, in which event the nut 34 may be of a size to fit such reduced end and clamp the sleeve 28 without occupying undue space.

36, 37, indicate a pair of coiled springs arranged in the bore 33 of the rod 29 and engaging at their inner ends the opposite sides of a collar 38 fixed on the free end of a thrust member 39. As shown, the spring 36 is interposed between the collar 38 and the end or bottom wall of the bore 33, whereas the spring 37 is interposed between the collar 38 and a ring 40 removably fixed at or adjacent the outer or open end of the bore 33.

From the foregoing description it will be seen that (1) operation of the thrust member 39 inwardly will compress the spring 36 if the reciprocating member is locked against movement or until its tension overcomes the resistance holding the rod 29 against movement in that direction, whereupon the rod will be operated with a relatively quick movement endwise toward the left in Fig. 3, and (2) operation of the thrust member 39 outwardly will compress the spring 37 if the reciprocating member is locked against movement or until its tension overcomes the resistance holding the rod 29 against movement in that direction, whereupon the rod will be operated with a relatively quick movement endwise toward the right in Fig. 3.

The thrust member 39 is connected to and operated in either direction by the lever 13, whereby (1) movement of the member 8 to release the brake 7 will effect a closing of the circuit through the contacts 25, 26, (see Fig. 4) and (2) movement of the member 8 in the opposite direction will effect a separation of the contacts 25, 26, and opening of the circuit therethrough (see Fig. 3). The connection between the thrust member 39 and lever 13 preferably comprises the following instrumentalities: 41 indicates a rod pivotally connected at its lower end to a knuckle provided on the lever 13; at its upper end the rod 41 is pivotally connected to one arm of a bell crank 42; the other arm of the bell crank 42 is bifurcated, and said bifurcations are formed with aligned openings 43 which support the opposite ends of a rocker 44. The rocker 44 is formed with a screw threaded opening whereby it may be adjustably secured upon the outer screw-threaded end of the thrust member 39. The ring 40 is preferably of such size as compared to the size of the thrust member 39 that the latter may freely accommodate itself to path of movement of its outer end as the crank arm to which it is connected swings in either direction. The crank 42 is pivoted on a short shaft or pin 45, preferably supported by the dash of the vehicle, as shown in Figs. 1 and 3. The rod 29 may have a flattened portion 29ᵃ, (see Fig. 6) with which engages the inner end of a plug 29ᵃ′ fitting an opening in the wall 18ᵈ to prevent rotation of the rod 29 at any time.

46 indicates as an entirety devices which control the movement of the reciprocating member 29 in correlation to the thrust member. Of these control devices, 47, 48, indicate a pair of plungers slidably mounted in openings 47ᵃ, 48ᵃ, respectively. The upper ends of the plungers slidably fit into recesses 47ᵇ, 48ᵇ, respectively, formed in the wall of a supplemental casing member 49. The casing member 49 is preferably fixed to the upper wall 18ᵈ of the casing 18 by screws or other devices 50. The recesses 47ᵇ, 48ᵇ, are provided as a convenient means for supporting springs 51, which normally act to push the plungers 47, 48, downwardly. At their lower ends, the plungers 47, 48, are provided with shoulders 47ᶜ, 48ᶜ, and these shoulders are arranged to engage transverse walls 52, 53, respectively, on the reciprocating rod 29. The transverse locking walls 52, 53, are spaced so that when the rod 29 is at its extreme left position (see Fig. 3) the wall 53 will engage the shoulder 48ᶜ and be locked thereby against movement toward in are correlated to close the circuit by the operation of the foot pedal in one direction, viz, downwardly, and to open the circuit by the movement of the foot pedal in the opposite direction.

To prevent driving of the truck without first operating the brake pedal or setting the truck in operation in the event the controller is in an "on" position I provide a lock and release mechanism 58. Of this mechanism, 71 indicates a ring fixed to and revolved by the shaft 15$^a$ of the controller 15. At one point in its circumference the ring 71 is provided with a cam 72 which acts on the outer end of a slide 73 mounted in an opening 74 formed in the base board 15$^b$ of the controller 15 and a collar 75 fixed to the outer face of the base board. The inner end of the slide 73 engages one arm of a bell crank 76, pivoted on a bracket 77 which is also fixed to the base board 15$^b$. The other arm of the bell crank 76 is operatively connected to the lower end of a rod 78. The upper end of the rod 78 is operatively connected to a socket member 79, adjustably fixed to the outer end of a lever 80. The lever 80 is mounted on a pivot 81, preferably carried by one end wall 18$^c$ of the casing 18. The inner end of the slide 73 is provided with a roller which rides on the circumferential edge of the ring 71 and cam 72. The cam 72 is so arranged angularly of the axis of the controller drum shaft 15$^a$ that when the controller 15 is in neutral position, the cam 72 will be in the position shown in Fig. 1$^a$ and the slide 73 will be moved to its inner position and the rod 78 and lever 80 will be elevated, but if the controller 15 is operated in either direction, the movement of the cam 72 with the drum will permit the slide 73 to move outwardly, operation taking place due to the gravitation of the rod 78, socket 79 and lever 80. 82 indicates a plunger mounted in a recess 83 formed in the extended adjacent end of the casing member 49. The plunger is formed with bifurcations 84 which permit it to straddle the lock and release rod 54 and the free ends of the bifurcations to engage the lever 80. The plunger 82 is preferably formed with a socket 85 to receive one end of a coiled spring 86. The other end of the spring engages the bottom wall of the recess 83. The spring 86 tends to push the plunger 82 downwardly, it being compressed by the plunger 82 when the latter is elevated by the lever 80, and supplementing the weight of the rod 78 and the elements associated therewith to move the slide 73 outwardly when the cam 72 is moved by the controller drum shaft 15$^a$.

When the cam 72 is thus moved, the plunger 82 is allowed to be actuated by the spring 86 downwardly in which position the body portion of the plunger will be disposed in the path of movement of a shoulder or upstanding member 87 carried by the rod 54, so that through the engagement of the shoulder 87 with the plunger 82, the rod 54 will be maintained inoperative, viz, prevented from moving endwise toward the right far enough for the cam 60 to operate the plunger 48. Accordingly, the reciprocating member 29 will be maintained in its locked position with the contacts separated. When the foot pedal 8 is operated under these conditions, the spring 67 will be compressed and thus permit movement of the rod 39 without transmitting its movement to the rod 54.

88 indicates ducts formed in the walls of the casing 18—only one being shown—and leading to the guides or walls for slidably supporting the reciprocating member 29 and rod 54 for conducting a lubricant thereto. The openings 88 are closed by closing devices 89 which permit the lubricant to be injected into the ducts 88.

90, 91, indicate a pair of auxiliary contacts, formed from carbon and carried by the contacts 25, 26, respectively; the provision of these contacts being for the purpose of preventing arcing when the contacts 25, 26, are separated. The contact 91 is rigidly supported in an opening formed in the block 27. The contact 90 is slidably mounted in a tubular member 92 preferably formed integrally with the block 25$^a$ of which the contact 25 is a part. The tubular member is flanged at one end as shown at 93 and provided at its opposite end with a removable ring 94 which limits the movement of the contact. The contact 90 is preferably mounted in a collar 95 which has sliding fit with the inner wall of the tubular member. The contact 90 is removably held in the collar by a cap 96 (having screw threaded engagement with the collar) which also serves as the means for securing one end of a lead 97 to insure an electrical connection from the block 25$^a$. The contact 90 is yieldingly maintained at the left end (as viewed in Figs. 3 and 5) of the tubular member 92 by a coiled spring 98 disposed between and engaging at its opposite ends the cap 96 and ring 94.

The contacts 90, 91, are so disposed that (1) in the movement of the reciprocating member 29 to close the circuit, they will engage and close the circuit ahead of the engagement of the contacts 25, 26, the spring 98 permitting the contact 90 to be moved by the contact 91 as the reciprocating member 29 moves to its extreme position, as shown in Fig. 4; and (2) in the movement of the reciprocating member in the opposite direction, the disengagement of the contacts 90, 91, will follow the disengagement of the contacts 25, 26; accordingly, the circuit will remain closed through the contacts 90, 91, until after the contacts 25, 26, are completely separated and the circuit opened therethe right; likewise when the rod 29 is at its extreme right position (see Fig. 4) the wall 52 will engage the shoulder 47ᶜ and be locked thereby against movement toward the left.

54 indicates a combined lock and release device slidably mounted in guides 55. The guides 55 preferably consist of slots or openings formed in the end walls of the supplemental casing member 49 and a groove 56 formed in and extending longitudinally of the upper casing wall 18ᵈ, the walls of the slots and grooves being shaped to receive the lock and release device 54. As shown, the guides 55 are preferably disposed in a plane which extends through or intersects the locking plungers 47, 48; accordingly, the latter are cut-away intermediate their ends as shown at 57, so that the upper end wall 57ᵃ of the cut-away portions will overlie the lock and release device 54. The lock and release device 54 preferably comprises a rod of rectangular shape. The rod 54 is of a length to extend to either side of the casing 18 (1) for connection at one end with the thrust member 39 and (2) for co-operation with elements of a mechanism, indicated as an entirety at 58, which maintains the lock and release device inoperative in the manner and for the reasons to be later set forth.

59, 60, indicate cams provided on the upper face of the rod 54 and arranged to engage the upper end walls 57ᵃ of the cut-away portions 57 formed in the plungers 47, 48. The cams 59, 60, are so positioned that when the rod 54 is moved from the position shown in Fig. 3 to the position shown in Fig. 4, the cam 60 will engage the wall 57ᵃ of the plunger 48 and move the latter upwardly in its guides 48ᵃ, thereby releasing the reciprocating member 29, which (as will be later set forth) is being acted upon by the spring 37; likewise upon movement of the rod 54 in the opposite direction back to the position shown in Fig. 3, the cam 59 will, through its engagement with the wall 57ᵃ of the plunger 47, release the latter from the reciprocating member 29. The rod 54 is operated in opposite directions by the thrust member 39 through connections, indicated as an entirety at 61, which permit movement of the thrust member 39 relative to the rod 54 when the latter is locked in an inoperative position or against unlimited movement by the mechanism 58. Of the connections 61, 62 indicates a cross-head having openings 63, 64, at its opposite ends to receive the thrust member 39 and rod 54, respectively, as shown in Figs. 2, 3, 4 and 5. The opening 63 is provided with screw threads fitting the screw threads upon the outer end of the thrust member 39, whereby the cross-head may be adjustably secured to the latter; a nut 65 being provided to lock the cross-head in its adjusted position. The opening 64 receives the rod 54 and permits the cross-head to be positioned against a collar or other abutment 66 fixed to the rod 54. 67 indicates a coiled spring surrounding rod 54 and disposed between the cross-head 62 and a nut 68 screw-threaded on the outer end of the rod 54. 69, 70, indicate washers or seat members mounted on the rod and interposed between the ends of the spring and the cross-head 62 and nut 68, respectively. The spring 67 acting through the nut 68 normally tends to maintain the collar 66 against the cross-head 62. From the foregoing description it will be seen that by reason of the connection 61 between the rod 54 and thrust member 39, the rod 54 will move with the latter when it is operated, unless the rod 54 is maintained inoperative by the mechanism 58, in which event the spring 67 permits the thrust member 39 to move relative to the rod 54.

Figs. 1 and 3 illustrate the position of the contacts 25, 26, the reciprocating member 29, the rod 54, lever 42, pedal 8, brake mechanism 7 and the connections between the lever 13 and lever 42 when the vehicle is standing still and ready for an operative to operate the truck. To operate the truck, the operative steps on the pedal 8. This operation releases the brake and, through the rod 41 and lever 42, moves the thrust member 39 toward the right in Fig. 3. The thrust member 39 through the cross-head 62, spring 67 and nut 68, in turn moves the rod 54 with it and compresses the spring 37. The cam 60 engages the wall 57ᵃ of the plunger 48 and releases the latter from the adjacent wall 53, whereupon the spring 37 operates the reciprocating member with a relatively quick movement to the position shown in Fig. 4, thereby moving the contact 26 into engagement with the contact 25 and closing the circuit from the battery or source of current supply to the controller 15. With the elements referred to in the position shown in Fig. 4, the controller lever may be operated in either direction to operate the controller 15 and motor accordingly. If the operative removes his foot from the pedal 8, the elements referred to under the influence of the spring 9 will move in the opposite direction, the thrust member 39 first compressing the spring 36 and putting it under tension, following which the cam 59 operates the plunger 47 to release the reciprocating member 29. Upon the release of the reciprocating member 29, the tension of the spring 36 actuates it with a relatively quick movement to the position shown in Fig. 3, thereby disengaging the contact 26 from the contact 25 and opening the circuit therethrough. When the contacts are in such position, the controller 15 may be operated by its lever, but such operation will be ineffectual. Thus it will be seen that the elements described herethrough, such arrangement and operation insuring a breaking of the circuit without undue arcing.

From the foregoing description it will be seen that I have provided a relatively simple construction in which all the elements are positively operated and controlled. It will also be seen that the contacts are engaged and disengaged with a snap action.

To those skilled in the art of making mechanism of the class described, many alterations in construction and widely different embodiments and applications of my invention will suggest themselves without departing from the spirit and scope thereof. My disclosures and the description herein are purely illustrative and are not intended to be in any sense limiting.

What I claim is:

1. A snap switch comprising a pair of contacts, a reciprocatable member which carries one of said contacts, means for locking said member against movement in either direction, a pair of compression springs carried by said member, a thrust element interposed between and engaging one of said springs to compress it when moved in either direction, means for moving said thrust element, and means connected to and moved by said thrust element moving means for operating said locking means to release said contact carrying member after one of said springs has been compressed.

2. A snap switch comprising a pair of contacts, a reciprocatable member which carries one of said contacts, means for locking said member against movement in either direction, a pair of compression springs carried by said member, a thrust element interposed between and engaging one of said springs to compress it when moved in either direction, means for moving said thrust element, and means connected to and moved by said thrust element moving means for operating said locking means to release said contact carrying member after either of said springs has been compressed.

3. In apparatus of the class described, the combination of a pair of contacts through which an electric circuit is opened and closed, a reciprocatable member which carries one of said contacts, means for locking said member against movement in either direction, a pair of compression springs carried by said member, a thrust element interposed between and engaging one of said springs to compress it when moved in either direction, means for moving said thrust element, and means connected to and moved by said thrust element moving means for operating said locking means to release said contact member after one of said springs has been compressed.

4. In apparatus of the class described, the combination of a pair of contacts through which an electric circuit is opened and closed, a reciprocatable member which carries one of said contacts, means for locking said member against movement in either direction, a pair of compression springs carried by said member, a thrust element interposed between and engaging one of said springs to compress it when moved in either direction, means for moving said thrust element, and means connected to and moved by said thrust element moving means for operating said locking means to release said contact member after either of said springs has been compressed.

5. In apparatus of the class described, the combination of a pair of contacts through which an electric circuit is opened and closed, a reciprocatable member carrying one of said contacts, means for locking said member against movement in either direction, a pair of compression springs carried by said member, a collar interposed between and engaging one of said springs to compress it when moved in either direction, means for moving said collar, and means operated by said moving means to release said locking means after one of said springs has been compressed.

6. In apparatus of the class described, the combination of a pair of contacts through which an electric circuit is opened and closed, a reciprocatable hollow member carrying one of said contacts, means for locking said member against movement in either direction, a pair of compression springs carried within the hollow portion of said member, a collar interposed between and engaging one of said springs to compress it when moved in either direction, a rod for moving said collar, and means operated from said rod to release said locking means after one of said springs has been compressed.

7. In apparatus of the class described, the combination of a pair of contacts through which an electric circuit is opened and closed, a reciprocatable hollow member carrying one of said contacts, means for locking said member against movement in either direction, a pair of compression springs carried within the hollow portion of said member, a collar interposed between and engaging one of said springs to compress it when moved in either direction, a rod for moving said collar, and cam means operated from said rod to release said locking means after one of said springs has been compressed.

8. In apparatus of the class described, the combination of a pair of contacts through which an electric circuit is opened and closed, a reciprocatable hollow member carrying one of said contacts, means for locking said member against movement in either direction, a pair of compression springs carried within the hollow portion of said member, a collar interposed between and engaging one of said springs to compress it when moved in either direction, a rod for moving said collar, a cross-head on said rod, and a cam operatively controlled by said cross-head to release said locking means after one of said springs has been compressed.

9. In apparatus of the class described, the combination of a pair of contacts through which an electric circuit is opened and closed, a reciprocatable hollow member carrying one of said contacts, means for locking said member against movement in either direction, a pair of compression springs carried within the hollow portion of said member, a collar interposed between and engaging one of said springs to compress it when moved in either direction, a rod for moving said collar, a cross-head on said rod, a cam member, and tension means connecting said cross-head to the cam member to release said locking means after one of said springs has been compressed.

10. In apparatus of the class described, the combination of a pair of contacts through which an electric circuit is opened and closed, a reciprocatable hollow member carrying one of said contacts, means for locking said member against movement in either direction, a pair of compression springs carried within the hollow portion of said member, a collar interposed between and engaging one of said springs to compress it when moved in either direction, a rod for moving said collar, a cross-head on said rod, and a cam device operatively controlled by said cross-head to release said locking means after either of said springs has been compressed.

In testimony whereof, I have hereunto affixed my signature.

EDWARD H. REMDE.